United States Patent [19]

Auriol et al.

[11] Patent Number: 5,030,050

[45] Date of Patent: Jul. 9, 1991

[54] BLIND RIVETING MEMBER, ASSEMBLY PROCESS AND ASSEMBLIES OBTAINED

[75] Inventors: Jean-Marc Auriol; Philippe Bornes, both of Balma, France

[73] Assignee: Ste. Ateliers de la Haute Garonne Ets Auriol & Cie., Balma, France

[21] Appl. No.: 525,465

[22] Filed: May 18, 1990

[30] Foreign Application Priority Data

May 19, 1989 [FR] France ................................ 89 06693

[51] Int. Cl.$^5$ ........................................... F16B 13/04
[52] U.S. Cl. ..................................... 411/38; 411/43; 411/55; 29/525.2
[58] Field of Search ................................... 411/34–38, 411/43, 55, 54, 69, 70; 29/524.1, 525.2

[56] References Cited

U.S. PATENT DOCUMENTS

| | | | |
|---|---|---|---|
| 3,365,998 | 1/1968 | Zahodiakin | 411/34 |
| 3,698,278 | 10/1972 | Trembley | 411/34 |
| 3,888,156 | 6/1975 | Fima | 411/38 |
| 4,457,652 | 7/1984 | Pratt | 411/34 |
| 4,752,168 | 6/1988 | Richter | 411/55 |

FOREIGN PATENT DOCUMENTS

| | | | |
|---|---|---|---|
| 61348 | 4/1975 | Australia | 411/38 |
| 2732393 | 2/1979 | Fed. Rep. of Germany | 411/38 |

*Primary Examiner*—Neill R. Wilson
*Attorney, Agent, or Firm*—Harold H. Dutton, Jr.

[57] ABSTRACT

The invention relates to a blind riveting member of the type comprising a tubular sleeve (1) and a mandrel (2) passing through said sleeve. The stem portion (5) of the tubular sleeve (1) comprises successively along its length, a first articulation zone (5a), an inclined portion (5b), a second articulation zone (5c) and an end portion (5d). These zones or portions are arranged in such a manner that the sleeve is subjected to a double folding during setting of the rivet which causes the inclined portion to expand and fold back upon itself toward the materials being assembled, forming a continuous rest surface at the periphery of the hole which contains the riveting member. The invention is applied in particular for assembling fragile materials such as composite materials. It permits providing a good vibration resistant holding for these materials without risk of damaging the same.

15 Claims, 4 Drawing Sheets

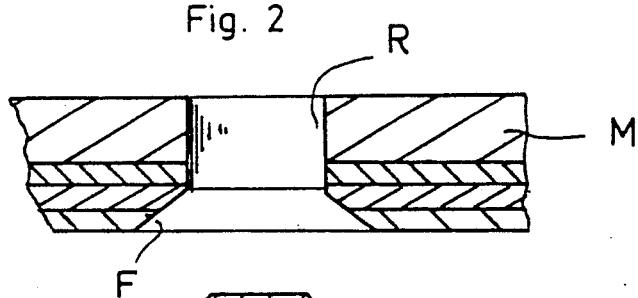
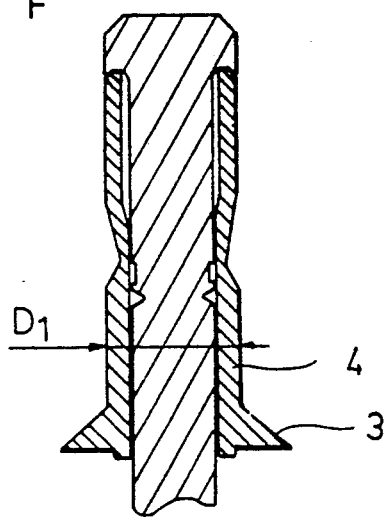
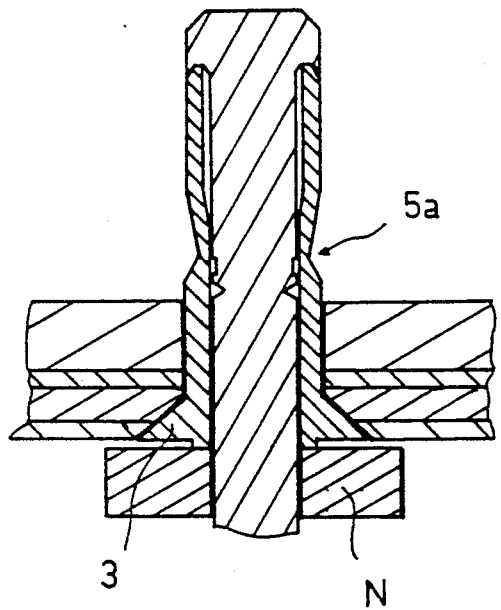
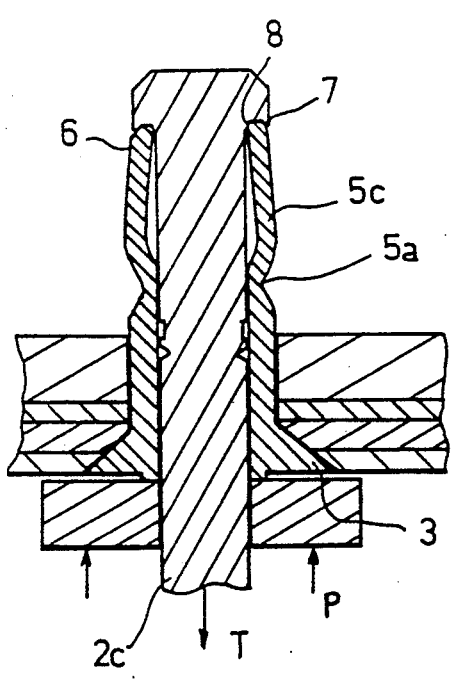

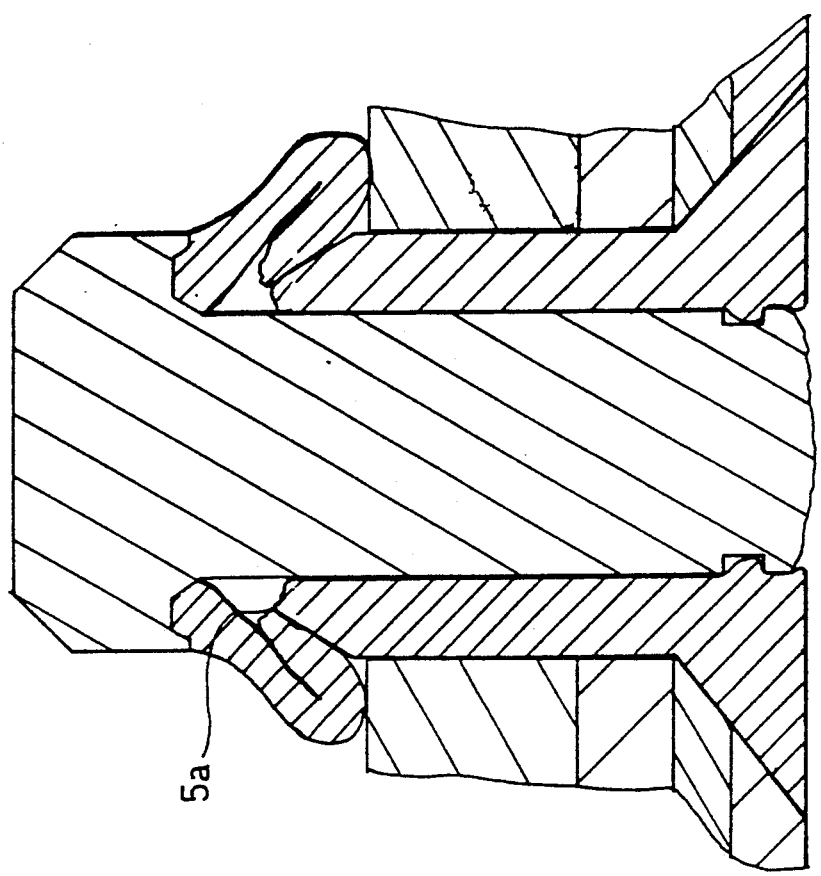
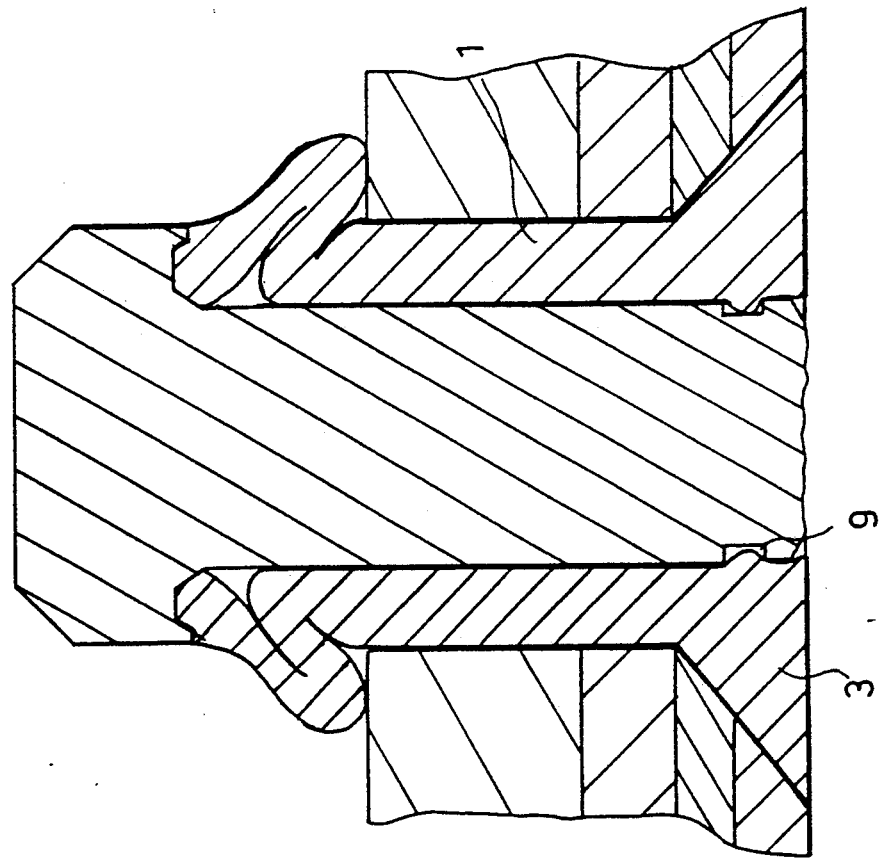

BLIND RIVETING MEMBER, ASSEMBLY PROCESS AND ASSEMBLIES OBTAINED

This invention relates to an improved blind riveting member. In particular, the invention relates to a tubular bushing needed to extend from the materials being assembled by a stem portion, a mandrel having a head intended to come to rest against the stem portion of the bushing and a rod housed in said bushing, the riveting being achieved by an axial drawing of the rod on the mandrel. The invention also extends to an assembly process using said riveting member, as well as to assemblies produced.

BACKGROUND AND OBJECTS OF THE INVENTION

In one known type of blind rivet, the head of the mandrel is shaped so as to be able to penetrate into the tubular bushing during tensioning in order to enlarge the same and to thus create a holding surface against the materials. French patent 2,306,361 or British patent 1,330,501 show, for example, rivets of this type. However, the bearing surface obtained by means of these rivets is very limited and, because of the enlarging, its direction is very inclined in the axial direction: such a bearing surface has a low vibration resistant and insecure holding, while it leads to a deleterious deformation of the materials at the edge of the hole. In particular, this deformation is unacceptable in the case of fragile materials (laminated, fiber reinforced synthetic materials) which are damaged at the edges of the hole with delamination and fraying of the fibers and of the binder.

In certain fastener members, the stem portion of the sleeve or bushing is divided into several sectors by means of longitudinal slots, and during tensioning of the mandrel, these sectors open and fold back on themselves to form several small gripping strips which come to rest against the materials to be assembled. For example, U.S. Pat. No. 4,289,061 shows such a member in which three longitudinal slots define three foldable sectors which are caused to open to form three material holding strips. However, the gripping or holding surface thus created is discontinuous and its holding ability is for this reasons considerably reduced, not only by reason of the reduction in its peripheral surface, but also and especially by reason of the discontinuity of the material around the periphery of the sleeve. Further, the materials to be assembled are held at the periphery of the hole by a series of holding zones separated by free zones, which is very undesirable, especially in the case of fragile materials where the stresses created at the junction of these zones may cause local damage. Further, the production of the securing members is more complex than in the preceding case by reason of the cutting of sectors which constitutes a delicate operation requiring high precision.

DESCRIPTION OF THE INVENTION

The present invention seeks to provide an improved blind riveting member permitting the creation during riveting of a continuous gripping surface, with a large surface area and an appropriate radial dimension, in order to achieve a firm and certain holding of the materials to be assembled without risk of damaging the materials, especially around the rivet hole in the material.

To this end, the blind riveting member provided by the invention comprises:

a tubular casing or sleeve having an insertion portion to be inserted through and housed in a hole in the materials to be riveted, and a stem portion extending beyond one side of said materials, a mandrel having a head portion of a diameter greater than that of the bore of the casing, and at least equal to the external diameter of the insertion portion thereof, and a shaft portion adapted to be housed in the bore of the casing, with a stem portion extension projecting from the opposite portion of the stem thereof in order to be subjected to an axial pulling on said mandrel.

According to the present invention, the blind riveting member is characterized in that the stem or shank portion of its tubular casing or sleeve comprises:

a first articulation zone situated in proximity to the junction between the stem portion and the insertion portion, said first articulation zone having a reduced thickness with respect to that of the insertion portion in order to condition a folding at its level during axial tensioning of the mandrel, an inclined portion connected to the first articulation zone, said portion having an inclination with respect to the axis of the casing in such a manner as to diverge therefrom beginning at the first articulation zone, a second articulation zone situated at the base of the inclined portion, said second articulation zone being a zone for changing the fold direction toward the axis of the casing for establishing a folding at its level during the axial tensioning on the mandrel, an end portion connected with the second articulation zone, said end portion having a different direction from that of the inclined portion and forming therewith an internal angle $\alpha$ of less than 180°, said portion and the head of the mandrel being provided with cooperating holding means adapted to prevent a radial sliding of the free end of the casing with respect to the head of the mandrel when it is exerting an axial tractive force on said mandrel.

Thus, in the riveting member of the invention, the tubular casing remains tubular over all of its length, that is, it is continuous over all of its perimeter up to the free end of the end portion. During riveting, the head of the mandrel is forced against the free end of the casing, the holding means preventing its sliding, and opening as in the case of the known expansion rivets. Under these conditions, an appropriate pulling on the extension of the mandrel, associated with a peripheral counterpressure on the casing, achieves a folding of the first and second articulation zones, causing the inclined portion of the casing (comprising the portion between the two zones of articulation) to expand and to fold back on itself toward the material being assembled until coming into contact against the material at the periphery of the hole. It is important to emphasize that the folding is programmed by the structures of the tubular casing and is carried out in a natural manner without the casing coming to bear against the edge of the hole during the folding. Thus, the materials to be assembled are protected. Upon completion of the folding, the contact between the head of the rivet and the surfaces of the materials is continuous, and of an appropriate radial extent to produce a good securing of said materials, and with a surface which may be much greater than with known expansion rivets, by reason of the process of double folding.

The casing and the mandrel of the riveting member according to the invention may be made of any materials suited to the intended application: titanium, stainless steel, lightweight alloys, etc. For example, for the assembly of fragile materials such as composite materials for which the invention is particularly significant and well suited, the casing may be made of titanium or a titanium alloy and the mandrel of stainless steel.

According to a preferred embodiment, the first articulation zone of the casing comprises an external groove which is arranged on the periphery of the casing in order to provide the above mentioned reduction in thickness at this zone. To permit an appropriate progressive folding, this groove is defined by two flared edges: on one side, one of these edges provides the junction with the insertion portion of the casing, while at the opposite side, the other edge forms the external face of the above-described inclined portion.

The inclined portion may in particular have a generally tubular truncated shape, while the second articulation zone may be an angular zone defining an internal angle $\alpha$ for changing direction between an inclined portion and an end portion, essentially comprising between 150° and 175°.

Further, according to a preferred embodiment, the end portion is an essentially cylindrical portion extending parallel to the axis.

The aforementioned holding means which has the function of preventing any risk of penetration of the head of the mandrel into the tubular casing when the radial drawing is exerted on the mandrel, may comprise conjugate shapes adapted to cooperate with each other, provided at the free end of the casing, and on the opposing face of the head of the mandrel.

The tubular casing of the riveting member according to the invention may be provided in a conventional manner with a preformed head situated opposite the stem portion. In some cases, the head of the casing may be provided during riveting by breaking the end of the casing opposite the stem portion.

Further, the riveting member according to the invention may be provided, in a known manner, with crimping means and means for breaking after placement, these conventional means providing at the end of the placement a rupture of the mandrel in the casing and causing a rupture of the extension of the mandrel stem.

DESCRIPTION OF THE DRAWINGS

The invention having been revealed in its general form, the description which follows with reference to the accompanying drawings describes the same by way of non-limiting examples of one embodiment. In these drawings, which form an integral part of the present description:

FIGS. 2, 3, 4, 5, 6 and 7 are schematic cross-sectional views, illustrating the setting of this riveting member;

FIG. 8 is an axial cross-section of the assembly obtained;

FIG. 9 is an axial cross-section showing a variation of the assembly obtained, after rupture of the tubular casing at the level of the first articulation zone.

Figure 1:
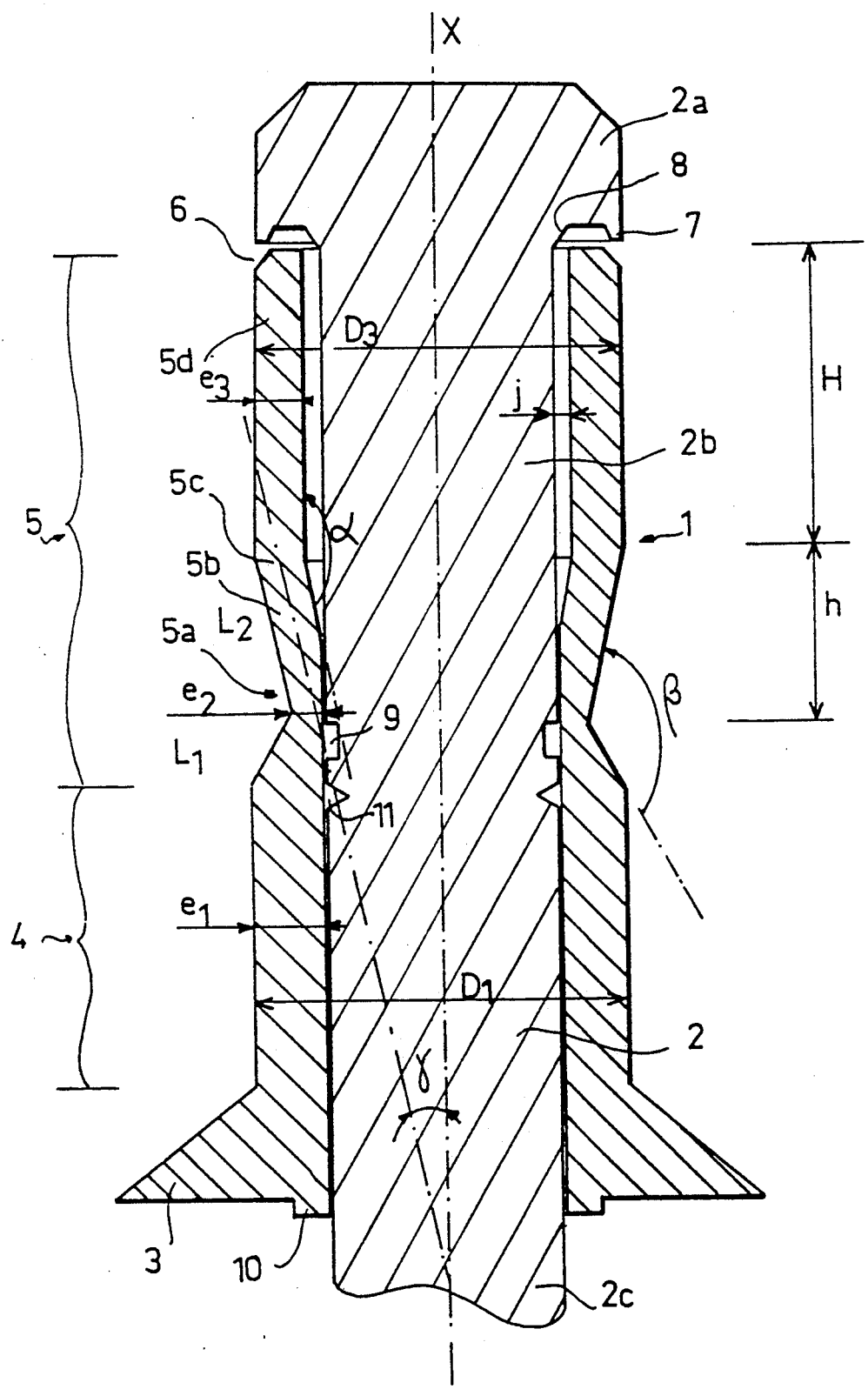
FIG. 1 is an axial cross-section, on an enlarged scale, of a riveting member according to the invention.

The riveting member shown by way of example in FIG. 1 comprises a tubular casing or sleeve 1 and a mandrel 2 extending along an axis X. For example, and particularly when used for the assembly of composite materials, the casing 1 may be of a titanium alloy and the mandrel 2 of stainless steel.

The casing 1 comprises a preformed head 3, constituted in the example shown by a countersunk head, the frustoconical face of which has a cone angle of about 120°.

This casing comprises further a shank forming an insertion portion 4 intended to be housed in the hole in the materials to be assembled and a stem portion 5 which extends beyond one side of said materials opposite the preformed head. The insertion portion 4 is delimited by two cylindrical surfaces.

The stem portion 5 comprises a first articulation zone $5a$ of reduced thickness, an inclined portion $5b$ diverging from the axis by an angle $\gamma$, a second articulation zone $5c$ defining a changing of direction of an angle $\alpha$ and an end portion $5d$.

The first articulation zone $5a$ is formed by an external groove delimited by two divergent ramps of a frustoconical shape, $L_1$, $L_2$, of which the opening angle B is between 120° and 160°, in the example on the order of 150°. The depth of said groove is such that the ratio $e_2/e_1$ of the thicknesses at the level of the zone $5a$ and at the level of the insertion portion 4 is approximately between 0.3 and 0.7, and preferably on the order of 0.45.

The edge $L_1$ of the groove provides the junction with the insertion portion 4, while the edge $L_2$ forms the external face of the inclined portion $5b$.

This inclined portion $5b$ presents a generally frustoconical tubular shape, forming with the axis X an angle $\gamma$, comprising essentially between 5° and 30°, in the example on the order of 10°. It is connected to the end portion $5d$ by the second zone of articulation $5c$ which defines an internal angle $\alpha$ for changing direction, comprising between 150° and 175°, in the example on the order of 170°.

The end portion $5d$ is cylindrical, that is bounded by two cylindrical surfaces about the axis x. The ratio $e_3/e_2$ of the thicknesses at the level of this end portion $5d$ and of the articulation zone $5a$ comprises between 1.3 and 1.9, in the example on the order of 1.6. Moreover, the ratio h/H of the axial lengths of the inclined portion $5b$ and the end portion $5d$ comprises between 0.4 and 1, in the example on the order of 0.7.

The external diameter $D_3$ of the end portion $5d$ is in the vicinity of the diameter $D_1$ of the insertion portion 4. In the example, these two diameters are equal ($D_1=D_3$).

At its free end, the end portion $5d$ comprises a chamfer 6 provided on the outer edge, in order to serve as means for holding this end during riveting.

The mandrel 2 is provided with a head $2a$ of an outer diameter equal to that of the insertion portion $5d$ of the casing. This mandrel has a cylindrical shank $2b$ adapted to be housed in the bore of the casing at the level of its insertion portion 4. Thus, an annular empty space—j—separates the inner cylindrical face from the end portion $5d$ and the cylindrical surface of the shank $2b$ of the mandrel.

On its face opposing the free end of the casing, the head $2a$ of the mandrel is provided with a ridge 7 of a shape corresponding to that of the chamfer 6 in order to be able to come to rest against the same and to prevent any centrifugal sliding of the free end of the casing during the riveting.

Further, the head of the mandrel is also provided with a chamfer 8 situated at the head/shank junction opposite the void space—j—separating the shank of the mandrel and the end portion of the casing. This chamfer 8 assures a holding of the free end of the casing in the centripetal direction.

The shank of the mandrel extends from the same side as the preformed head 3 of the casing by an extension 2c which permits exerting the axial tensile riveting force.

It should be noted that the diameter of the shank 2b of the mandrel which corresponds to the bore of the insertion portion 4 of the casing may be slightly greater than the latter in such a manner as to assure an expansion of this insertion portion during the riveting (the extension of the shank 2c thus has a diameter less than that of the part 2b of the shank).

Further, the riveting member according to the invention is provided in a known manner with means for crimping the mandrel in the casing and means for rupturing the extension of the mandrel at the end of the placement. This crimping means may, for example, comprise a circular groove 9 arranged on the shank of the mandrel and a circular rib 10 provided on the head 3 of the casing in such a manner as to form an excess of material able to flow toward the groove 9 at the end of the riveting. The rupturing means may comprise a groove 11 of a depth adapted to produce at its level a rupture upon exertion of a predetermined tensile force.

FIGS. 2 through 7 illustrate the setting of the riveting member described above in the thicknesses of composite materials M. These materials have a hole R of a diameter corresponding essentially to the external diameter $D_1$ of the insertion portion 4, with a recess F of a shape corresponding to that of the preformed head 3 (FIG. 2).

The riveting member is placed into this hole and a conventional riveting tool comprising an annular anvil N is applied against the preformed head 3 (FIG. 3). The riveting member is selected as a function of the thickness of the materials to be assembled in such a manner that the first articulation zone 5a is on the exterior and in the vicinity of the materials. (It should be noted that different thicknesses may be assembled by means of the same rivet, the double folding thereof taking place is carried out until the fold formed comes to rest against the materials.

Figure 5:
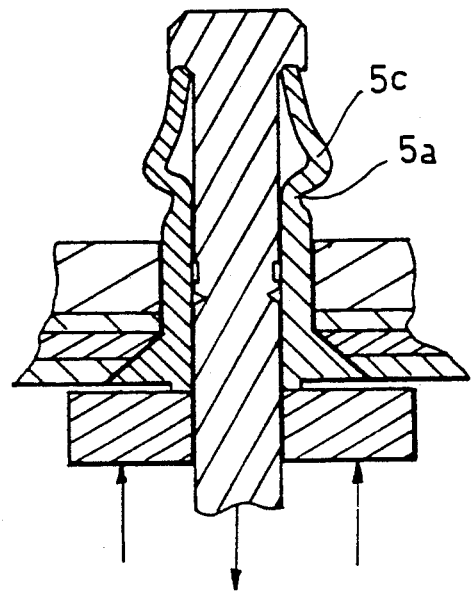
Figure 6:
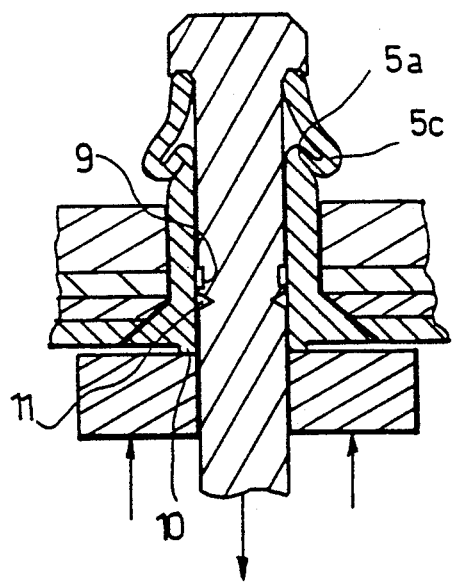
Figure 7:
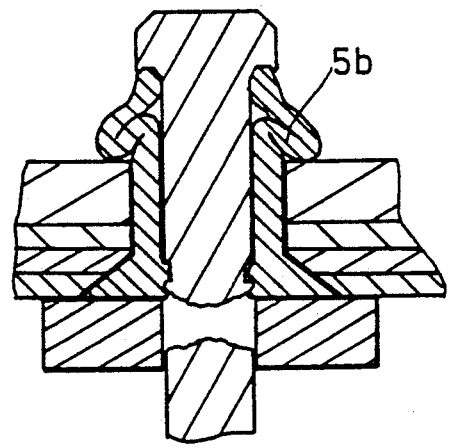

The extension 2c of the shank of the mandrel is gripped by the jaws of the tool and a tension or stretching force T is exerted on the shank of the mandrel, at the same time that a counterpressure P is applied by the anvil N on the preformed head 3 (FIG. 4). The free end of the casing, held by the holding means 6-8 against the head of the mandrel, subject to a longitudinal force which, because of the structural arrangement of the stem portion 5, is translated by the force moments at the level of the two articulation zones 5c and 5a, causing a folding at these zones (FIGS. 5, 6 and 7). This folding (in reverse directions at these two zones) leads to a bending back of the inclined portion 5b which comes to be urged against the materials (FIG. 7). It is important to note that the holding area thus created is continuous over the entire circumference of the casing and has a surface and a radial extent assuring a secure and certain holding of the materials, without damaging the same at the edges of the hole, while the folding itself is carried out without pressure against the edges of the hole in the materials.

At the end of the placement, the crushing of the rib 10 of the head of the casing conditions a creeping towards the groove 9 of the shank of the mandrel and a setting thereof, while said shank breaks at the level of the rupture groove 11. The end of the casing is itself set in the head of the mandrel, which contributes to making less deformable the fold of the casing which forms the setting against the materials.

The assembly obtained is shown schematically in FIG. 8. Over its entire length, the casing 1 is reinforced by the mandrel 2 which fills it (with eventual expansion as previously indicated), which confers on the assembly an excellent resistance to shear stress and fatigue.

It is also significant to note that, as illustrated in FIG. 9, a rupture of the casing may be produced at the level of the first articulation zone 5a (according to the nature of the material used, the relative dimensions of the various parts, and the riveting forces). This rupture does not present any problems and does not reduce the holding ability of the assembly.

While this invention has been described as having certain preferred features and embodiments, it will be apparent that it is capable of still further variation and modification without departing from the spirit of the invention, and this application is intended to cover any and all variations, modifications and adaptations of the invention which fall within the spirit of the invention and the scope of the appended claims.

We claim:

1. A blind riveting member comprising:
    a tubular casing (1) having an insertion portion (4) adapted to be housed in a hole in the materials to be riveted and a stem portion (5) adapted to extend from one side of said materials,
    a mandrel (2) having a head (2a) of a diameter greater than the bore of the casing (1) and a shank (2b) adapted to be housed in the bore of the casing, with an extension (2c) extending opposite the stem portion thereof for exerting an axial tension on said mandrel, said riveting member being characterized in that the stem portion (5) of the casing comprises:
    a first articulation zone (5a) situated in proximity to the junction between the stem portion (5) and the insertion portion (4), said first articulation zone having a reduced thickness with respect to that of the insertion portion for conditioning a folding at its level during axial tensioning of the mandrel (2),
    an inclined portion (5b) connected to the first articulation zone (5a), said portion having an inclination with respect to the axis (X) of the casing in such a manner as to diverge therefrom with respect to said first articulation zone,
    a second articulation zone (5c) situated at the base of the inclined portion (5b), said second articulation zone being a zone for changing direction toward the axis of the casing in order to condition a folding at its level during axial tensioning of the mandrel (2),
    an end portion (5d) connected to the second articulation zone (5c), said end portion having a different direction from that of the inclined portion (5b) and forming with said latter an internal angle α less than 180°, said end portion (5d) and the head (2a) of the mandrel being provided with holding means (6-8) adapted to prevent a radial sliding of the free end of the casing with respect to the head of the mandrel when it is exerting the axial tension on said mandrel, and
    the thickness $e_2$ of the casing at the level of the first articulation zone (5a) being such that $0.3 < e_2/e_1 < 0.7$, where $e_1$ is the thickness of said casing at the level of the insertion portion (4).

2. A blind riveting member as in claim 1, characterized in that the first articulation zone (5a) of the casing comprises an outer groove arranged on the periphery of said casing and defined by two flared ledges ($L_1$, $L_2$), one on a side providing the junction with the insertion portion (4), the other on the opposite side forming the outer face of the inclined portion (5b) of said casing.

3. A blind riveting member as in claim 2, characterized in that the angle of opening B formed by the two lips ($L_1$, $L_2$) of the groove is essentially between 120° and 160°.

4. A blind riveting member as in claim 1, characterized in that the inclined portion (5b) of the casing forms with the axis (X) an angle of inclination $\gamma$ comprising essentially between 5° and 30°.

5. A blind riveting member as in claim 1, characterized in that the inclined portion (5b) of the casing has a generally frustoconical tubular shape.

6. A blind riveting member as in claim 1, characterized in that the second articulation zone (5c) is an angular zone for changing the direction defining an internal angle $\alpha$ between the inclined portion (5b) and the end portion (5d) comprising essentially between 150° and 175°.

7. A blind riveting member as in claim 1, characterized in that the end portion (5d) of the casing is an essentially cylindrical portion extending parallel to the axis (X).

8. A blind riveting member as in claim 1, characterized in that the thickness $e_3$ of the casing at the level of the end portion (5d) is such that $1.3 \leq e_3/e_2 \leq 1.9$, the external diameter $D_3$ of said end portion (5d) being at least equal to the external diameter $D_1$ of the insertion portion.

9. A blind riveting member as in claim 7, characterized in that the holding means comprises an external chamfer (6) arranged on the free end of the end portion (5d) of the casing and a corresponding collar (7d) provided on the face opposite the head of the mandrel (2a) for preventing a centrifugal sliding of the free end of the casing.

10. A riveting member as in claim 9, characterized in that the head of the mandrel (2a) comprises a chamfer (8) at the head/shank junction for holding the free end of the casing in the centripetal direction.

11. A riveting member as in claim 1, and wherein the tubular casing (1) has a preformed head (3) opposite its stem portion (5).

12. A riveting member as in claim 1, comprising means (9, 10) for swaging the mandrel in the casing and means for rupturing the extension of the mandrel at the end of the setting thereof.

13. A blind riveting member comprising:
a tubular casing (1) having an insertion portion (4) adapted to be housed in a hole in the materials to be riveted and a stem portion (5) adapted to extend from one side of said materials,
a mandrel (2) having a head (2a) of a diameter greater than the bore of the casing (1) and a shank (2b) adapted to be housed in the bore of the casing, with an extension (2c) extending opposite the stem portion thereof for exerting an axial tension on said mandrel, said riveting member being characterized in that the stem portion (5) of the casing comprises:
a first articulation zone (5a) situated in proximity to the junction between the stem portion (5) and the insertion portion (4), said first articulation zone having a reduced thickness with respect to that of the insertion portion for conditioning a folding at its level during axial tensioning of the mandrel (2),
an inclined portion (5b) connected to the first articulation zone (5a), said portion having an inclination with respect to the axis (X) of the casing in such a manner as to diverge therefrom with respect to said first articulation zone,
a second articulation zone (5c) situated at the base of the inclined portion (5b), said second articulation zone being a zone for changing direction toward the axis of the casing in order to condition a folding at its level during axial tensioning of the mandrel (2), and
an end portion (5d) comprising an essentially cylindrical portion extending parallel to said axis (X) and having an annular void space (j) separating the internal cylindrical face from the end portion (5d) of the casing and the cylindrical surface of said shank of the mandrel, and being connected to the second articulation zone (5c), said end portion having a different direction from that of the inclined portion (5b) and forming with said latter an internal angle $\alpha$ less than 180°, said end portion (5d) and the head (2a) of the mandrel being provided with holding means (6-8) adapted to prevent a radial sliding of the free end of the casing with respect to the head of the mandrel when it is exerting the axial tension on said mandrel.

14. A riveting member as in claim 13, characterized in that the inclined portion (5b) and the end portion (5d) of the casing have axial lengths h and H respectively such that $0.41 \leq h/H \leq 1$.

15. A process for the assembly of materials with at least one riveting member comprising providing a riveting member including a tubular casing (1) having an insertion portion (4) adapted to fit in a hole in the materials to be riveted and a stem portion (5) adapted to extend from one side of said materials, a mandrel (2) having a head (2a) of a diameter greater than the bore of the casing (1) and a shank (2b) adapted to be housed in the bore of the casing, with an extension (2c) extending opposite the stem portion thereof for exerting an axial tension on said mandrel, the stem portion (5) of the casing comprising a first articulation zone (5a) situated in proximity to the junction between the stem portion (5) and the insertion portion (4), the first articulation zone having a reduced thickness with respect to that of the insertion portion for conditioning a folding at its level during axial tensioning of the mandrel (2), an inclined portion (5b) connected to the first articulation zone (5a), said portion having an inclination with respect to the axis (X) of the casing in such a manner as to diverge therefrom with respect to said first articulation zone, a second articulation zone (5c) situated at the base of the inclined portion (5b), said second articulation zone being a zone for changing direction toward the axis of the casing in order to condition a folding at its level during axial tensioning of the mandrel (2), an end portion (5d) connected to the second articulation zone (5c), said end portion having a different direction from that of the inclined portion (5b) and forming with said latter an internal angle $\alpha$ less than 180°, the end portion (5d) and the head (2a) of the mandrel being provided with holding means (6-8) adapted to prevent a radial sliding of the free end of the casing with respect to the head of the mandrel when it is exerting the axial tension on the mandrel, and the thickness $e_2$ of the casing at the level of the first articulation zone (5a) being such that $0.3 \leq e_2/e_1 \leq 0.7$, where $e_1$ is the thickness of said casing at the level of the insertion portion (4), piercing the materials with a hole of a diameter corresponding essentially to the external diameter of the insertion portion of the casing, placing said riveting member in this hole such that the stem portion of the casing extends to one side and the extension of the mandrel extends to the other side of the hole, applying the head of the mandrel against the free end of the end portion of the casing for bringing their holding means into cooperation and applying tension to the extension of the mandrel and a peripheral counterpressure to the casing, thereby causing a folding of the first and second articulation zones, for bringing the inclined portion of the casing into contact against the materials at the periphery of the hole.

* * * * *